United States Patent
Adachi et al.

(10) Patent No.: US 9,796,214 B2
(45) Date of Patent: Oct. 24, 2017

(54) PNEUMATIC TIRE

(71) Applicant: SUMITOMO RUBBER INDUSTRIES, LTD., Kobe-shi, Hyogo (JP)

(72) Inventors: Yukishige Adachi, Kobe (JP); Yutaka Ichiryu, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 350 days.

(21) Appl. No.: 14/347,943

(22) PCT Filed: Oct. 2, 2012

(86) PCT No.: PCT/JP2012/075442
§ 371 (c)(1),
(2) Date: Mar. 27, 2014

(87) PCT Pub. No.: WO2013/054685
PCT Pub. Date: Apr. 18, 2013

(65) Prior Publication Data
US 2014/0230986 A1   Aug. 21, 2014

(30) Foreign Application Priority Data
Oct. 12, 2011   (JP) ................ 2011-225051

(51) Int. Cl.
*B60C 5/14* (2006.01)
*B29D 30/38* (2006.01)
(Continued)

(52) U.S. Cl.
CPC ............. *B60C 5/14* (2013.01); *B29D 30/38* (2013.01); *B29D 30/44* (2013.01); *B60C 1/0008* (2013.01);
(Continued)

(58) Field of Classification Search
CPC .. B60C 1/008; B60C 9/14; B60C 5/14; B60C 5/142; B60C 9/1835; B60C 9/185
See application file for complete search history.

(56) References Cited

U.S. PATENT DOCUMENTS 6,123,132 A * 9/2000 Appleton ................ B60C 5/142
                                                      152/458
7,404,424 B2 * 7/2008 Higuchi ................ B60C 1/0008
                                                      152/458
(Continued)

FOREIGN PATENT DOCUMENTS

JP       4-254203       *  9/1992
JP       06286017       * 10/1994
(Continued)

OTHER PUBLICATIONS

International Search Report issued in PCT/JP2012/075442, dated Dec. 18, 2012.

*Primary Examiner* — Justin Fischer
(74) *Attorney, Agent, or Firm* — Birch, Stewart, Kolasch & Birch, LLP

(57) ABSTRACT

To provide a pneumatic tire 34 in which weight reduction is achieved without deteriorating internal pressure maintaining performance. The tire 34 includes a liner 46 located inward of a carcass 42. The liner 46 includes a first inner liner 66 extending on and between one of beads and the other of the beads and along and inward of the carcass 42; and a pair of second inner liners 68 extending from ends 62a of a belt 44, respectively, along the first inner liner 66 substantially inward in a radial direction. The second inner liners 68 are located between the first inner liner 66 and the carcass 42. The first inner liner 66 is formed by a first rubber composition being crosslinked. A base rubber of the first rubber composition includes a butyl rubber. Each second inner liner 68 is formed by a second rubber composition being cross- (Continued)

linked. A base rubber of the second rubber composition includes a diene rubber.

8 Claims, 7 Drawing Sheets

(51) Int. Cl.
   *B29D 30/44*  (2006.01)
   *B60C 1/00*   (2006.01)
   *C08L 23/22*  (2006.01)
   *B60C 9/02*   (2006.01)
   *B60C 9/18*   (2006.01)

(52) U.S. Cl.
   CPC .............. *B60C 5/142* (2013.01); *B60C 9/02* (2013.01); *C08L 23/22* (2013.01); *B60C 9/1835* (2013.01); *B60C 2005/145* (2013.01); *B60C 2005/147* (2013.01)

(56) References Cited

U.S. PATENT DOCUMENTS

2008/0128947 A1* 6/2008 Sakamoto .......... B29D 30/0601
                                                        264/326
2009/0032176 A1   2/2009 Hata
2009/0229726 A1   9/2009 Nakane et al.
2012/0325388 A1* 12/2012 Lavalle ................ B60C 1/0008
                                                        152/527

FOREIGN PATENT DOCUMENTS

| JP | 7-266814     | * | 10/1995 |
| JP | 10-16082 A   |   | 1/1998  |
| JP | 10-129208 A  |   | 5/1998  |
| JP | 11-59120 A   |   | 3/1999  |
| JP | 2000-225654  | * | 8/2000  |
| JP | 2002-178714 A|   | 6/2002  |
| JP | 2006-256557 A|   | 9/2006  |
| JP | 2007-229941 A|   | 9/2007  |
| JP | 2008-30575 A |   | 2/2008  |
| JP | 2009-274680 A|   | 11/2009 |
| JP | 2010-18202   | * | 1/2010  |
| JP | 2010-36669 A |   | 2/2010  |
| JP | 2010-173501 A|   | 8/2010  |
| JP | 2011-126400 A|   | 6/2011  |
| JP | 2011-178318  | * | 9/2011  |
| KR | 2003-0093624 A|  | 12/2003 |
| KR | 810393       | * | 3/2008  |

* cited by examiner

PNEUMATIC TIRE

TECHNICAL FIELD

The present invention relates to pneumatic tires.

BACKGROUND ART

FIG. 6 is a cross-sectional view showing a portion of a conventional pneumatic tire 2. The tire 2 includes a tread 4, sidewalls 6, a carcass 8, a belt 10, and a liner 12.

The liner 12 is located inward of the carcass 8. The liner 12 is joined to the inner peripheral surface of the carcass 8. The liner 12 includes a first inner liner 14 and a second inner liner 16. The first inner liner 14 forms an inner portion of the liner 12. The second inner liner 16 is located between the first inner liner 14 and the carcass 8.

The first inner liner 14 is obtained by crosslinking a first rubber composition. The principal component of the base rubber of the first rubber composition is generally isobutylene-isoprene-rubber. The first inner liner 14 is excellent in air blocking property. The first inner liner 14 serves to maintain the internal pressure of the tire 2.

The second inner liner 16 is obtained by crosslinking a second rubber composition. The principal component of the base rubber of the second rubber composition is generally natural rubber. The second inner liner 16 serves to join the first inner liner 14 to the inner peripheral surface of the carcass 8. In addition, the second inner liner 16 prevents the first inner liner 14 from directly contacting with cords included in the carcass 8. Thus, occurrence of cord loose is prevented.

In light of weight reduction of the tire 2, the configuration of the liner 12 has been variously examined. Examples of such examination are disclosed in JP2002-178714 and JP2008-30575.

FIG. 7 shows a conventional tire 18 different from the tire 2 shown in FIG. 6. The tire 18 includes a tread 20, sidewalls 22, a carcass 24, a belt 26, and a liner 28. The tire 18 has the same configuration as that of the tire 2 shown in FIG. 6, except for the liner 28.

In the tire 18, the liner 28 includes a pair of first inner liners 30 arranged so as to be spaced apart from each other in the axial direction; and a second inner liner 32 joined to the inner peripheral surface of the carcass 24. Similarly to the tire 18 shown in FIG. 6, the first inner liners 30 serve to maintain the internal pressure of the tire 18. The second inner liner 32 serves to join the first inner liners 30 to the inner peripheral surface of the carcass 24.

In the tire 18, the first inner liners 30 are not provided at an equator portion thereof. The tire 18 is lighter than the tire 2 shown in FIG. 6. The first inner liners 30 in which a middle portion is removed can contribute to weight reduction of the tire 18.

CITATION LIST

Patent Literature

Patent Literature 1: JP2002-178714
Patent Literature 2: JP2008-030575

SUMMARY OF THE INVENTION

Problems to be Solved by the Invention

In the tire 18 shown in FIG. 7, the entire inner surface thereof is not covered with the first inner liners 30. As described above, the first inner liners 30 serve to maintain the internal pressure of the tire 18. The tire 18 has a problem that air injected into the inside of the tire 18 gradually leaks through the portion of the tread 20 at which the first inner liners 30 are not provided. The tire 18 is poor in internal pressure maintaining performance.

An object of the present invention is to provide a pneumatic tire in which weight reduction is achieved without deteriorating internal pressure maintaining performance.

Solution to the Problems

A pneumatic tire according to the present invention includes: a tread having an outer surface which forms a tread surface; a pair of sidewalls extending from ends of the tread, respectively, substantially inward in a radial direction; a pair of beads located substantially inward of the sidewalls, respectively, in the radial direction; a carcass extending on and between one of the beads and the other of the beads and along and inward of the tread and the sidewalls; a belt laminated on the carcass at an inner side, in the radial direction, of the tread; and a liner located inward of the carcass. Outer ends of the sidewalls are located inward of ends of the belt in an axial direction. The liner includes a first inner liner extending on and between one of the beads and the other of the beads and along and inward of the carcass; and a pair of second inner liners extending from the ends of the belt, respectively, along the first inner liner substantially inward in the radial direction. The second inner liners are located between the first inner liner and the carcass. Outer ends of the second inner liners are located inward of the ends of the belt in the axial direction. The first inner liner is formed by a first sheet, formed from a first rubber composition, being crosslinked. Each second inner liner is formed by a second sheet, formed from a second rubber composition, being crosslinked. Each second sheet has a reference end corresponding to the outer end of the second inner liner. In forming the liner, each second sheet is attached to the first sheet such that the reference end of the second sheet abuts against an outer surface of the first sheet. Each second sheet has an inclined surface extending from the reference end so as to be inclined relative to the outer surface of the first sheet. An inclination angle of the inclined surface of each second sheet is equal to or greater than 10° but equal to or less than 45°. A base rubber of the first rubber composition includes a butyl rubber. A base rubber of the second rubber composition includes a diene rubber.

Preferably, in the pneumatic tire, the outer ends of the second inner liners are located inward of the outer ends of the sidewalls in the axial direction.

Preferably, in the pneumatic tire, a distance from the outer end of each second inner liner to the outer end of each sidewall is equal to or greater than 5 mm but equal to or less than 30 mm.

Preferably, in the pneumatic tire, a thickness of each second sheet is equal to or greater than 0.3 mm but equal to or less than 1.5 mm.

Preferably, in the pneumatic tire, the carcass includes a carcass ply. In forming the carcass, the carcass ply is pricked, whereby holes are formed therein.

Preferably, in the pneumatic tire, an interval at which the carcass ply is pricked is equal to or greater than 20 mm but equal to or less than 100 mm.

Advantageous Effects of the Invention

In the pneumatic tire according to the present invention, the first inner liner is formed by a first sheet being crosslinked. The first sheet is formed from a first rubber composition. The first rubber composition includes a butyl rubber. The first inner liner is excellent in air blocking property. In the tire, the entirety of the inner peripheral surface of the carcass is covered with the first inner liner. The tire is excellent in internal pressure maintaining performance.

In the tire, each of the pair of second inner liners is formed by a second sheet being crosslinked. Each second sheet is formed from a second rubber composition. The second rubber composition includes a diene rubber. The second inner liners are located between the first inner liner and the carcass. The second inner liners can join the first inner liner to the inner peripheral surface of the carcass. In the tire, the second inner liners are not provided at an equator portion of the tire. The liner of the tire can contribute to weight reduction. According to the present invention, a tire can be obtained in which weight reduction is achieved without deteriorating internal pressure maintaining performance.

DESCRIPTION OF EMBODIMENTS

The following will describe in detail the present invention based on preferred embodiments with appropriate reference to the drawings.

Figure 1:
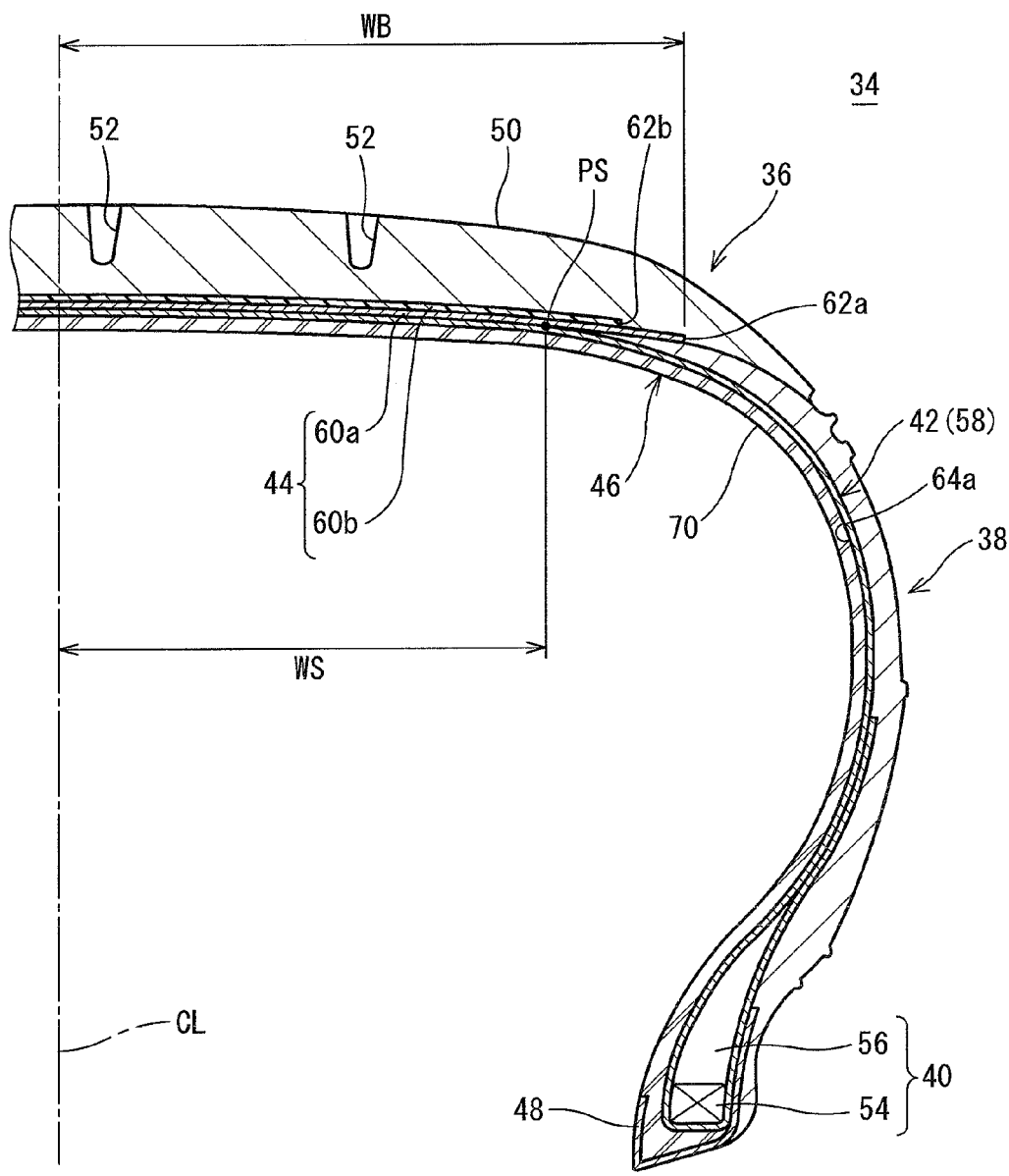
FIG. 1 is a cross-sectional view showing a portion of a pneumatic tire according to an embodiment of the present invention.

A pneumatic tire 34 shown in FIG. 1 includes a tread 36, sidewalls 38, beads 40, a carcass 42, a belt 44, a liner 46, and chafers 48. The tire 34 is of a tubeless type. The tire 34 is mounted on a passenger car.

In FIG. 1, the up-down direction is a radial direction, the right-left direction is an axial direction, and the direction perpendicular to the surface of the sheet is a circumferential direction. The tire 34 has a shape which is substantially bilaterally symmetrical about an alternate long and short dash line CL in FIG. 1. The alternate long and short dash line CL represents the equator plane of the tire 34.

The tread 36 is formed from a crosslinked rubber that is excellent in wear resistance. The tread 36 has a shape projecting outward in the radial direction. The outer surface of the tread 36 forms a tread surface 50. In other words, the tread 36 has the tread surface 50. The tread surface 50 contacts with a road surface. Grooves 52 are formed on the tread surface 50. A tread pattern is formed by the grooves 52. The grooves 52 may not be formed on the tread 36.

The sidewalls 38 extend from ends of the tread 36 substantially inward in the radial direction. The sidewalls 38 are formed from a crosslinked rubber. The sidewalls 38 bend. The sidewalls 38 absorb shocks from a road surface. In addition, the sidewalls 38 prevent injury of the carcass 42.

The beads 40 are located substantially inward of the sidewalls 38 in the radial direction. Each bead 40 includes a core 54 and an apex 56 extending from the core 54 outward in the radial direction. The core 54 has a ring shape. The core 54 is formed by a non-stretchable wire being wound. Typically, a steel wire is used for the core 54. The apex 56 is tapered outward in the radial direction. The apex 56 is formed from a highly hard crosslinked rubber.

The carcass 42 is formed of a carcass ply 58. The carcass ply 58 extends on and between the beads 40 at both sides. The carcass ply 58 extends along and inward of the tread 36 and the sidewalls 38. The carcass ply 58 is turned up around each core 54 from the inner side to the outer side in the axial direction.

The carcass ply 58 includes a large number of cords aligned with each other, and a topping rubber, which is not shown. The absolute value of the angle of each cord relative to the equator plane is generally 70° to 90°. In other words, the carcass 42 has a radial structure. The cords are generally formed from an organic fiber. Examples of preferable organic fibers include polyester fibers, nylon fibers, rayon fibers, polyethylene naphthalate fibers, and aramid fibers. A carcass 42 having a bias structure may be used.

The belt 44 is located outward of the carcass 42 in the radial direction. The belt 44 is laminated on the carcass 42 at an inner side, in the radial direction, of the tread 36. The belt 44 reinforces the carcass 42. The belt 44 of the tire 34 includes an inner layer 60a and an outer layer 60b. As shown, the inner layer 60a is wider than the outer layer 60b. In the belt 44, ends 62a of the inner layer 60a are located outward of ends 62b of the outer layer 60b in the axial direction. In the tire 34, the ends 62a of the inner layer 60a are ends of the belt 44. When the outer layer 60b is wider than the inner layer 60a, the ends 62b of the outer layer 60b are the ends of the belt 44.

Each of the inner layer 60a and the outer layer 60b includes a large number of cords aligned with each other, and a topping rubber, which is not shown. Each cord is tilted relative to the equator plane. The absolute value of the tilt angle is equal to or greater than 10° but equal to or less than 35°. The direction in which each cord of the inner layer 60a is tilted is opposite to the direction in which each cord of the outer layer 60b is tilted. The material of the cords is preferably steel. An organic fiber may be used for the cords.

In FIG. 1, a reference sign PS indicates an outer end of the sidewall 38. As shown, in the tire 34, the outer end PS of the sidewall 38 is located inward of the end 62a of the belt 44 in the axial direction.

In FIG. 1, a double-headed arrow WS indicates the distance in the axial direction from the equator plane to the outer end PS of the sidewall 38. The distance WS is half of the distance in the axial direction from the outer end PS of one of the sidewalls 38 to the outer end PS of the other of the sidewalls 38. A double-headed arrow WB indicates the distance in the axial direction from the equator plane to the end 62a of the belt 44. The distance WB is half of the width, in the axial direction, of the belt 44.

In the tire 34, the ratio of the distance WS relative to the distance WB is equal to or greater than 70% but equal to or less than 90%. The range of the ratio is the same as that of each of the conventional tires 2 and 18.

The liner 46 is located inward of the carcass 42. The liner 46 is joined to an inner peripheral surface 64a of the carcass 42. The liner 46 extends on and between one of the beads 40 and the other of the beads 40 and along and inward of the carcass 42. The liner 46 covers the entirety of the inner peripheral surface 64a of the carcass 42.

Figure 2:
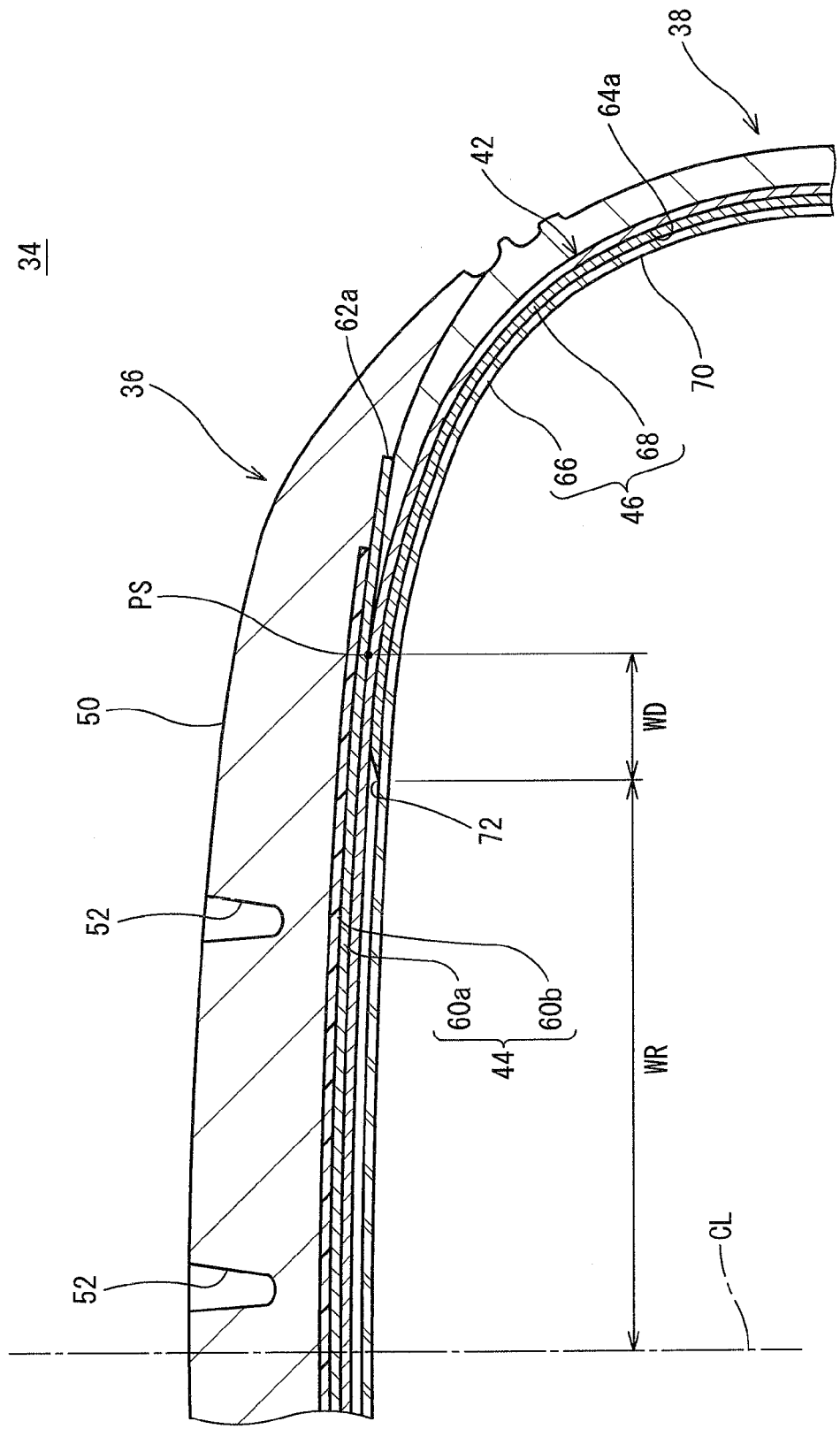
FIG. 2 is an enlarged cross-sectional view showing a portion of the tire in FIG. 1.

FIG. 2 shows a portion of the tread 36 of the tire 34 shown in FIG. 1. As shown, the liner 46 includes a first inner liner 66 and a second inner liner 68.

The first inner liner 66 forms an inner portion of the liner 46. The first inner liner 66 extends on and between one of the beads 40 and the other of the beads 40 and along and inward of the carcass 42.

In the tire 34, the first inner liner 66 is formed by a first rubber composition being crosslinked. In other words, the first inner liner 66 is formed from a crosslinked rubber.

In the tire 34, the base rubber of the first rubber composition includes a butyl rubber. The butyl rubber has a low air permeation coefficient as compared to the other rubbers. The first inner liner 66 including the butyl rubber is excellent in air blocking property.

Examples of the butyl rubber include isobutylene-isoprene-rubber and halogenated isobutylene-isoprene-rubber. Examples of the halogenated isobutylene-isoprene-rubber include chloro-butyl rubber and bromo-butyl rubber. In light of air blocking property, isobutylene-isoprene-rubber is preferred as the butyl rubber. Two or more types of butyl rubbers may be used in combination.

In the tire 34, in light of processability, another rubber other than the butyl rubber can be included in the base rubber. In this case, in light of air blocking property, it is preferred that the butyl rubber is included as a principal component. Specifically, the proportion of the butyl rubber to the entire base rubber is preferably equal to or greater than 60% by weight and particularly preferably equal to or greater than 80% by weight. It should be noted that examples of the other rubber include natural rubber, isoprene rubber, and ethylene-propylene-diene ternary copolymer.

The first rubber composition includes a reinforcing material. The reinforcing material is typically carbon black. Carbon black such as FEF, GPF, HAF, ISAF, SAF, and the like can be used. In light of strength of the first inner liner 66, the amount of carbon black with respect to 100 parts by weight of the base rubber is preferably equal to or greater than 5 parts by weight and particularly preferably equal to or greater than 10 parts by weight. In light of flexibility of the first inner liner 66, the amount of carbon black is preferably equal to or less than 50 parts by weight and particularly preferably equal to or less than 40 parts by weight. Together with or instead of the carbon black, silica may be used. Wet silica and dry silica can be used.

The first rubber composition can include a filler. Examples of the filler include calcium carbonate, magnesium carbonate, aluminum hydroxide, magnesium hydroxide, alumina, clay, talc, and magnesium oxide. Two or more fillers may be used in combination in the first rubber composition. In addition to the filler, the first rubber composition can also include chemicals such as a softener, a tackifier, a crosslinking agent such as sulfur or the like, a vulcanization accelerator, a crosslinking activator, an antioxidant, and the like. In consideration of processability and performance of the tire 34, optimum chemicals are blended into the first rubber composition in optimum amounts.

In the tire 34, the liner 46 includes a pair of second inner liners 68. Each second inner liner 68 is located between the first inner liner 66 and the carcass 42. Each second inner liner 68 extends from the end 62a of the belt 44 along the first inner liner 66 substantially inward in the radial direction. Each second inner liner 68 is located inward of the sidewall 38 in the axial direction.

In the tire 34, each second inner liner 68 is formed by a second rubber composition being crosslinked. In other words, each second inner liner 68 is formed from a crosslinked rubber.

In the tire 34, the base rubber of the second rubber composition includes a diene rubber. The diene rubber can contribute to adhesiveness. Each second inner liner 68 including the diene rubber is excellent in adhesiveness. As described above, each second inner liner 68 is located between the first inner liner 66 and the carcass 42. Each second inner liner 68 serves to join the first inner liner 66 to the inner peripheral surface 64a of the carcass 42.

Examples of the diene rubber include natural rubber, isoprene rubber, butadiene rubber, styrene-butadiene rubber, chloroprene rubber, and acrylonitrile butadiene rubber. In light of adhesiveness, natural rubber is preferred as the diene rubber. Two or more types of diene rubbers may be used in combination.

In the tire 34, in light of processability, another rubber other than the diene rubber can be included in the base rubber. In this case, in light of adhesiveness, it is preferred that the diene rubber is included as a principal component. Specifically, the proportion of the diene rubber to the entire base rubber is preferably equal to or greater than 60% by weight and particularly preferably equal to or greater than 80% by weight. It should be noted that examples of the other rubber include ethylene-propylene rubber, urethane rubber, and acrylic rubber.

The second rubber composition includes a reinforcing material. The reinforcing material is typically carbon black. Carbon black such as FEF, GPF, HAF, ISAF, SAF, and the like can be used. In light of strength of each second inner liner 68, the amount of carbon black with respect to 100 parts by weight of the base rubber is preferably equal to or greater than 5 parts by weight and particularly preferably equal to or greater than 10 parts by weight. In light of flexibility of each second inner liner 68, the amount of carbon black is preferably equal to or less than 50 parts by weight and particularly preferably equal to or less than 40 parts by weight. Together with or instead of the carbon black, silica may be used. Wet silica and dry silica can be used.

The second rubber composition can include a filler. Examples of the filler include calcium carbonate, magnesium carbonate, aluminum hydroxide, magnesium hydroxide, alumina, clay, talc, and magnesium oxide. Two or more fillers may be used in combination in the second rubber composition. In addition to the filler, the second rubber composition can also include chemicals such as a softener, a tackifier, a crosslinking agent such as sulfur or the like, a vulcanization accelerator, a crosslinking activator, an antioxidant, and the like. In consideration of processability and performance of the tire 34, optimum chemicals are blended into the second rubber composition in optimum amounts.

In the tire 34, the first inner liner 66 which forms a portion of the liner 46 covers the entirety of the inner peripheral surface 64a of the carcass 42. An inner surface 70 of the first inner liner 66 forms the inner surface of the tire 34. As described above, the first inner liner 66 is excellent in air blocking property. The first inner liner 66 serves to maintain the internal pressure of the tire 34. The liner 46 of the tire 34 can prevent leak of air injected into the inside of the tire 34. The tire 34 is excellent in internal pressure maintaining performance.

In the tire 34, the pair of second inner liners 68 which form the other portion of the liner 46 are arranged so as to be spaced apart from each other in the axial direction. In the tire 34, a portion of the inner peripheral surface 64a of the carcass 42 is not covered with the second inner liners 68. In other words, the second inner liners 68 are not provided at an equator portion of the tire 34. The liner 46 can contribute to weight reduction of the tire 34. The tire 34 including the liner 46 is lightweight. As described above, in the tire 34, leak of the air injected into the inside of the tire 34 is suppressed by the first inner liner 66 which covers the entirety of the inner peripheral surface 64a of the carcass 42. In the tire 34, weight reduction is achieved without deteriorating internal pressure maintaining performance.

In the tire 34, an end 72 located at the outer side in the radial direction (hereinafter, an outer end) of each second inner liner 68 is located inward of the end 62a of the belt 44 in the axial direction. In other words, a portion of each second inner liner 68 and a portion of the belt 44 overlap each other in the radial direction. This overlapping can contribute to air blocking property. The tire 34 is excellent in internal pressure maintaining performance.

In the tire 34, the outer end 72 of each second inner liner 68 is preferably located inward of the outer end PS of the sidewall 38 in the axial direction. Thus, formation of a step due to the outer end 72 of the second inner liner 68 can be prevented. The tire 34 has high quality.

In FIG. 2, a double-headed arrow WR indicates the distance in the axial direction from the equator plane to the outer end 72 of the second inner liner 68. The distance WR is half of the distance in the axial direction from the outer end 72 of one of the second inner liners 68 to the outer end 72 of the other of the second inner liners 68. The distance WR is also the width, in the axial direction, of the portion at which the second inner liner 68 is not provided. A double-headed arrow WD represents the distance in the axial direction from the outer end PS of the sidewall 38 to the outer end 72 of the second inner liner 68. When the outer end 72 of the second inner liner 68 is located inward of the outer end PS of the sidewall 38 in the axial direction, the distance WD is indicated as a positive value. When the outer end 72 of the second inner liner 68 is located outward of the outer end PS of the sidewall 38 in the axial direction, the distance WD is indicated as a negative value.

As described above, in the tire 34, the outer end 72 of each second inner liner 68 is located inward of the end 62a of the belt 44 in the axial direction. Therefore, the ratio of the distance WR relative to the distance WB is less than 100%. Thus, in the tire 34, excellent internal pressure maintaining performance can be kept. In this respect, the ratio is preferably equal to or less than 98% and more preferably equal to or less than 90%. Furthermore, from the standpoint that formation of a step due to the outer end 72 of the second inner liner 68 can be prevented, the ratio is further preferably equal to or less than 70% and particularly preferably equal to or less than 67%. In light of weight reduction of the tire 34, the ratio is preferably equal to or greater than 50% and more preferably equal to or greater than 58%.

In the tire 34, the distance WD is preferably equal to or greater than 5 mm. Thus, formation of a step due to the outer end 72 of the second inner liner 68 can be effectively prevented. In light of weight reduction of the tire 34, the distance WD is preferably equal to or less than 15 mm and more preferably equal to or less than 10 mm.

The tire 34 is manufactured as follows. The first rubber composition is sheeted by using a calender roll. Thus, a first sheet formed from the first rubber composition is obtained.

Figure 3:
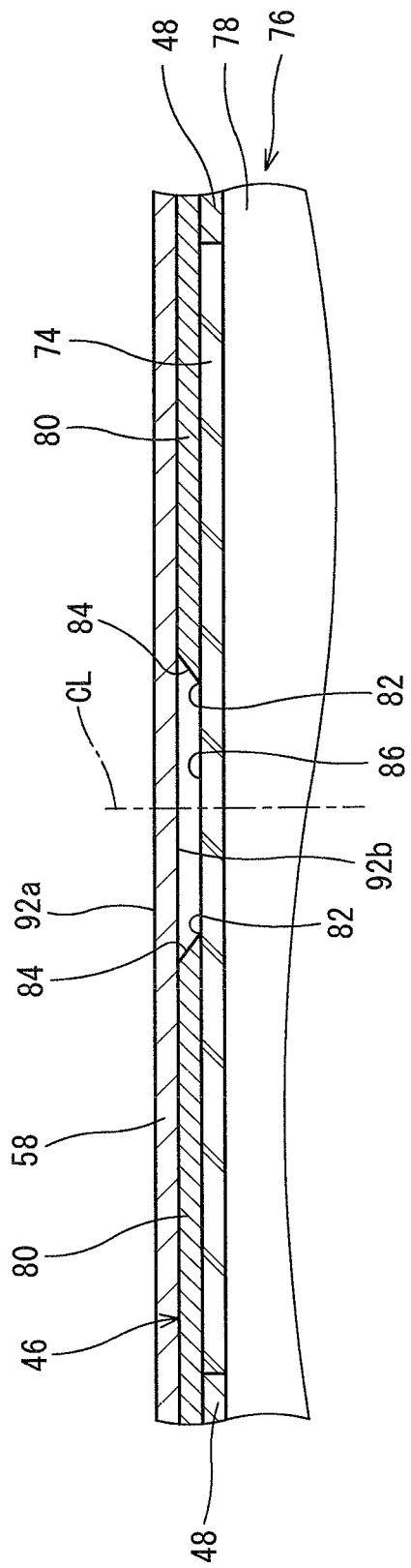
FIG. 3 is a schematic diagram showing a formation situation of a liner provided in the tire in FIG. 1.

As shown in FIG. 3, a first sheet 74 is wound around a drum 78 of a former 76. Thus, the first sheet 74 is formed into a tubular shape. The chafers 48 are wound on both sides of the first sheet 74 respectively.

In the manufacturing method, the second rubber composition is sheeted by using a calender roll. Thus, a pre-sheet is obtained. In the manufacturing method, a center portion of the pre-sheet is cut out by using two cutters, which is not shown. Thus, a pair of second sheets 80 are obtained.

As shown in FIG. 3, in the manufacturing method, the two second sheets 80 are wound on the first sheet 74. These second sheets 80 are laminated on the first sheet 74 so as to be spaced apart from each other in the axial direction. In laminating, an end 82 located at the inner side in the axial direction (hereinafter, a reference end) of each of these second sheets 80 is located inward of a position (not shown), corresponding to the end 62a of the belt 44, in the axial direction. The reference ends 82 of the second sheets 80 correspond to the outer ends 72 of the second inner liners 68 in the tire 34.

In the manufacturing method, the carcass ply 58 is wound on the outer side of the second sheets 80. Furthermore, components such as the belt 44, the tread 36, the sidewalls 38, the beads 40, and the like are assembled to obtain a raw cover (also referred to as an uncrosslinked tire).

In the manufacturing method, the raw cover is put into a mold, which is not shown. The outer surface of the raw cover abuts against a cavity surface of the mold. The inner surface of the raw cover abuts against a bladder or a core. The raw cover is pressurized and heated in the mold. The rubber composition in the raw cover flows due to the pressurization and the heating. Cross-linking reaction is caused in the rubber due to the heating. In the manufacturing method, the first sheet 74 is crosslinked to form the first inner liner 66. The second sheets 80 are crosslinked to form the second inner liners 68. In the manufacturing method, the tire 34 is obtained in this manner.

Figure 4:
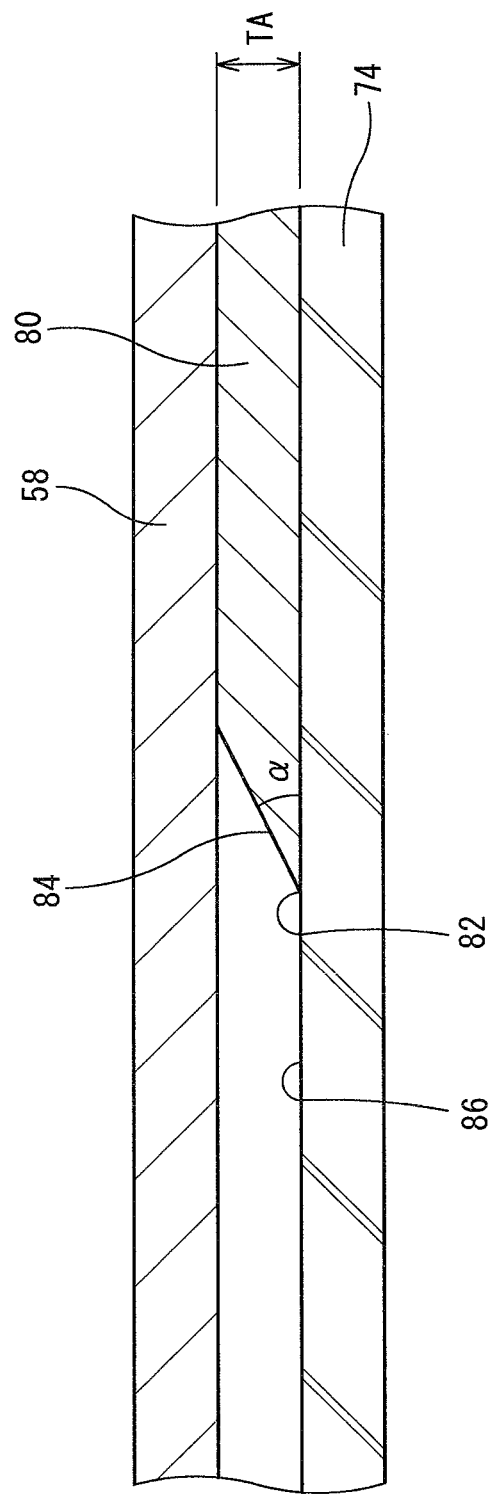
FIG. 4 is an enlarged schematic diagram showing a portion of the liner in FIG. 3.

FIG. 4 shows a portion around the reference end 82 of the second sheet 80 in FIG. 3, in an enlarged manner. As shown, the second sheet 80 has an inclined surface 84. The inclined surface 84 extends from the reference end 82 of the second sheet 80 so as to be inclined relative to an outer surface 86 of the first sheet 74. In the manufacturing method, the inclined surface 84 of the second sheet 80 is formed by adjusting the angle of the blade of the cutter in cutting out the center portion from the pre-sheet.

In the manufacturing method, in forming the liner 46, the second sheets 80 are attached to the first sheet 74 such that the reference ends 82 of the second sheets 80 abut against the outer surface 86 of the first sheet 74. As shown, the inclined surface 84 of each second sheet 80 attached to the first sheet 74 extends from the reference end 82 outward in the axial direction so as to be inclined outward in the radial direction. In the manufacturing method, the liner 46 is formed such that the distance in the axial direction from the inclined surface 84 of one of the second sheets 80 to the inclined surface 84 of the other of the second sheets 80 increases from the inner side toward the outer side in the radial direction.

In the manufacturing method, the raw cover has a space surrounded by the first sheet 74, the left and right second sheets 80, and the carcass 42. In the space, gas is present. In a vulcanization step of the manufacturing method, the core or the bladder can urge the raw cover from the first sheet 74 side outward in the radial direction. Thus, the gas present in the space is dissolved in a portion at the outer side of the liner 46.

As described above, in the manufacturing method, the inclined surface 84 of each second sheet 80 attached to the first sheet 74 extends from the reference end 82 outward in the axial direction so as to be inclined outward in the radial direction. Therefore, the space has a shape spreading from the inner side toward the outer side in the radial direction. Thus, in the vulcanization step, when the core or the bladder urges the raw cover outward in the radial direction, shift of the gas in the space to the portion at the outer side of the liner 46 is promoted. In the manufacturing method, the inclined surface 84 of each second sheet 80 can contribute to the shift of the gas. In the manufacturing method, occurrence of defective appearance due to remaining of the gas is suppressed. In the manufacturing method, the high-quality tire 34 can be stably manufactured.

In FIG. 4, an angle α represents an inclination angle of the inclined surface 84 provided in the second sheet 80. The inclination angle α is indicated as the angle between the outer surface 86 of the first sheet 74 and the inclined surface 84.

In the manufacturing method, the inclination angle α is equal to or greater than 10° but equal to or less than 45°. When the inclination angle α is set so as to be equal to or greater than 10°, the inclined surface 84 can easily be formed in each second sheet 80. In this respect, the inclination angle α is preferably equal to or greater than 25°. When the inclination angle α is set so as to be equal to or less than 45°, the above-described shift of the gas can be promoted. In the manufacturing method, a reduction in quality due to remaining of the gas can be effectively prevented. In this respect, the inclination angle α is preferably equal to or less than 30°.

In FIG. 4, a double-headed arrow TA represents the thickness of the second sheet 80. In the manufacturing method, the thickness TA is preferably equal to or greater than 0.3 mm and preferably equal to or less than 1.5 mm. When the thickness TA is set so as to equal to or greater than 0.3 mm, the second inner liner 68 obtained from the second sheet 80 can sufficiently join the first inner liner 66 to the carcass 42. In this respect, the thickness TA is more preferably equal to or greater than 0.5 mm. When the thickness TA is set so as to be equal to or less than 1.5 mm, formation of a step due to the thickness of the second sheet 80 is prevented. Since the space surrounded by the first sheet 74, the left and right second sheets 80, and the carcass 42 is reduced, remaining of the gas is effectively suppressed. In the manufacturing method, the high-quality tire 34 can be manufactured. In this respect, the thickness TA is more preferably equal to or less than 1.0 mm.

In the manufacturing method, from the standpoint that discharge of the gas from the space can be promoted and a reduction in quality due to remaining of the gas can be effectively prevented, in forming the carcass 42, the carcass ply 58 forming the carcass 42 is preferably pricked, whereby holes are formed therein.

Figure 5:
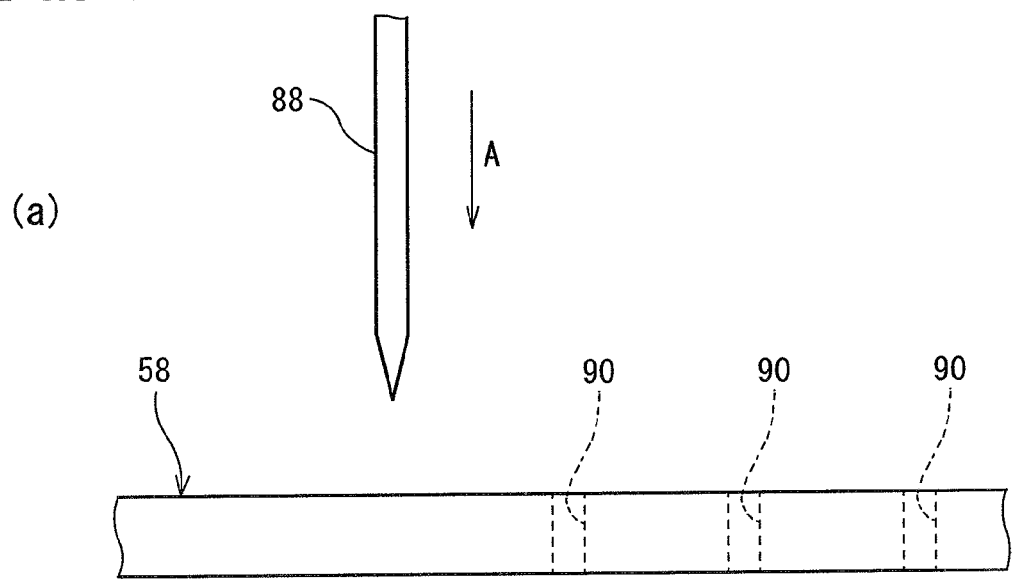
FIG. 5 is a schematic diagram showing a formation situation of a carcass provided in the tire in FIG. 1.
Figure 5:
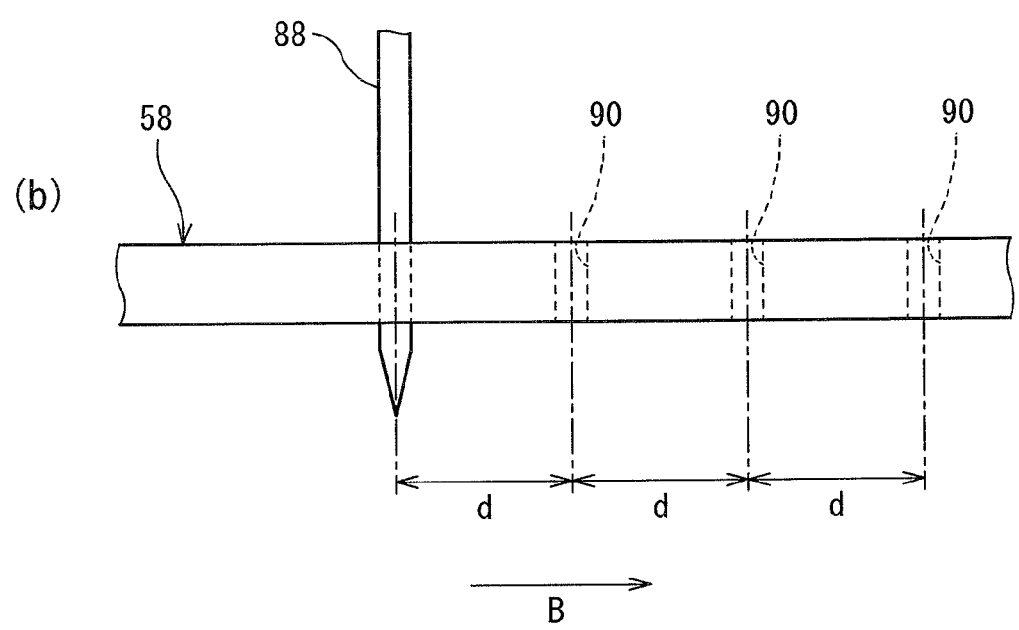

FIG. 5 shows a situation in which the carcass ply 58 is being pricked. In pricking, a holing apparatus (not shown) is used. The holing apparatus includes a drill 88. The drill 88 advances toward the carcass ply 58. This state is shown in (a) of FIG. 5. In the drawing, the direction indicated by an arrow A is the advancing direction of the drill 88. Due to this advancement, the drill 88 penetrates the carcass ply 58. This state is shown in (b) of FIG. 5.

In the manufacturing method, the drill 88 is pulled out from the carcass ply 58 by the drill 88 retracting from the carcass ply 58, which is not shown. Due to this pulling-out, a hole 90 is formed in the carcass ply 58. After the pulling-out, the carcass ply 58 moves in the direction indicated by an arrow B. After the movement, the drill 88 is advanced to make another hole 90 in the carcass ply 58. In pricking, such movement of the drill 88 is repeated. In the manufacturing method, the carcass ply 58 is formed by a rubber composition being extruded together with a large number of cords. The above-described direction indicated by the arrow B coincides with the extruded direction of the carcass ply 58. Therefore, the pricking is conducted along the extruded direction of the carcass ply 58.

In the manufacturing method, the holing apparatus includes a plurality of drills 88, which is not shown. These drills 88 are aligned at equal intervals along the width direction of the carcass ply 58. The intervals are generally 50 mm to 200 mm.

In the manufacturing method, from the standpoint that holes 90 which can contribute to discharge of the gas are obtained, the outer diameter of each drill 88 is preferably equal to or greater than 1 mm and preferably equal to or less than 4 mm.

In (b) of FIG. 5, a double-headed arrow d indicates the interval at which the pricking is conducted. The interval d is also referred to a pitch between the holes 90 made by the pricking. The interval d is represented as the distance between the center of one hole 90 and the center of another hole 90 located adjacent to the one hole 90 in the moving direction of the carcass ply 58.

In the manufacturing method, the interval d at which the pricking is conducted is preferably equal to or greater than 20 mm and preferably equal to or less than 100 mm. When the interval d is set so as to be equal to or less than 100 mm, a reduction in quality due to remaining of the gas can be effectively prevented. In the manufacturing method, the high-quality tire 34 can be stably manufactured. When the interval d is set so as to be equal to or greater than 20 mm, a reduction in productivity due to the conduct of the pricking can be prevented.

In the manufacturing method, in forming the carcass 42, a plurality of aligned bleeder cords may be laminated on an outer surface 92a or an inner surface 92b of the carcass ply 58 forming the carcass 42. Each of these bleeder cords is formed by twisting a large number of filaments. In each bleeder cord, a large number of minute gaps are present. The bleeder cords can absorb gas. The bleeder cords can contribute to prevention of occurrence of defective appearance due to remaining of the gas. In light of efficient absorption of gas, the bleeder cords are preferably laminated on the inner surface 92b of the carcass ply 58. In laminating, the distance between one of the bleeder cords and another of the bleeder cords is preferably equal to or greater than 50 mm and preferably equal to or less than 150 mm.

In the manufacturing method, the filaments which are constituent elements of the bleeder cords are formed from an organic fiber. Examples of preferable organic fibers include polyester fibers, polyethylene terephthalate fibers, polyethylene naphthalate fibers, and aramid fibers.

In the present invention, the dimensions and angles of each component of the tire 34 are measured in a state where the tire 34 is mounted on a normal rim and inflated to a normal internal pressure. During the measurement, no load is applied to the tire 34. In the present specification, the normal rim means a rim specified in a standard on which the tire 34 is based. The "standard rim" in the JATMA standard, the "Design Rim" in the TRA standard, and the "Measuring Rim" in the ETRTO standard are normal rims. In the present specification, the normal internal pressure means an internal pressure specified in the standard on which the tire 34 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. It should be noted that in the case of a tire 34 for a passenger car, the dimensions and angles are measured in a state where the internal pressure is 180 kPa.

EXAMPLES

The following will show effects of the present invention by means of examples, but the present invention should not be construed in a limited manner based on the description of these examples.

Example 1

A pneumatic tire for a passenger car of Example 1 having the fundamental structure shown in FIGS. 1 and 2 and having specifications shown in Table 1 below was obtained. The size of the tire is 175/65R14. In the tire, the ratio of the distance WS in the axial direction from the equator plane to the outer end PS of each sidewall relative to half WB of the width, in the axial direction, of the belt was set as 75%. The ratio (WR/WB) of the distance WR in the axial direction from the equator plane to the outer end of each second inner liner relative to the width WB was set as 67%. The distance WD in the axial direction from each outer end PS to the outer end of each second inner liner was set as 5 mm. In forming the liner, the inclination angle α of the inclined surface of each second sheet was set as 45° (degrees). The thickness TA of each second sheet was set as 0.5 mm. Bleeder cords were laminated on the inner peripheral surface of the carcass ply. This is indicated as "A" in the table. As the bleeder cords, cords formed from a polyethylene terephthalate fiber (hereinafter, PET fiber) were used. Each of the bleeder cords was configured with 1400 dtex/2. The carcass ply was pricked. The interval d at which the pricking was conducted was set as 60 mm.

Examples 2 to 8 and Comparative Example 2

Tires of Examples 2 to 8 and Comparative Example 2 were obtained in the same manner as Example 1, except the ratio (WR/WB) and the distance WD were as shown in Tables 1 and 2 below.

Example 9 and Comparative Example 3

Tires of Example 9 and Comparative Example 3 were obtained in the same manner as Example 1, except the inclination angle α was as shown in Table 3 below.

Examples 10 and 11

Tires of Examples 10 and 11 were obtained in the same manner as Example 1, except the thickness TA was as shown in Table 3 below.

Example 12

A tire of Example 12 was obtained in the same manner as Example 1, except the bleeder cords were laminated on the outer peripheral surface of the carcass ply, which is indicated as "B" in the table.

Example 13

A tire of Example 13 was obtained in the same manner as Example 1, except the bleeder cords were not provided.

Examples 14 to 19

Tires of Examples 14 to 19 were obtained in the same manner as Example 1, except the distance d was as shown in Table 4 below. It should be noted that the carcass ply of Example 14 is not pricked.

Examples 20 to 23 and Comparative Examples 4 and 5

Tires of Examples 20 to 23 and Comparative Examples 4 and 5 were obtained in the same manner as Example 1, except the inclination angle α was as shown in Table 5 below, the pricking was not conducted, and the bleeder cords were not provided.

Examples 24 to 27

Tires of Examples 24 to 27 were obtained in the same manner as Example 1, except the thickness TA was as shown in Table 6 below, the pricking was not conducted, and the bleeder cords were not provided.

Comparative Example 1

Figure 6:
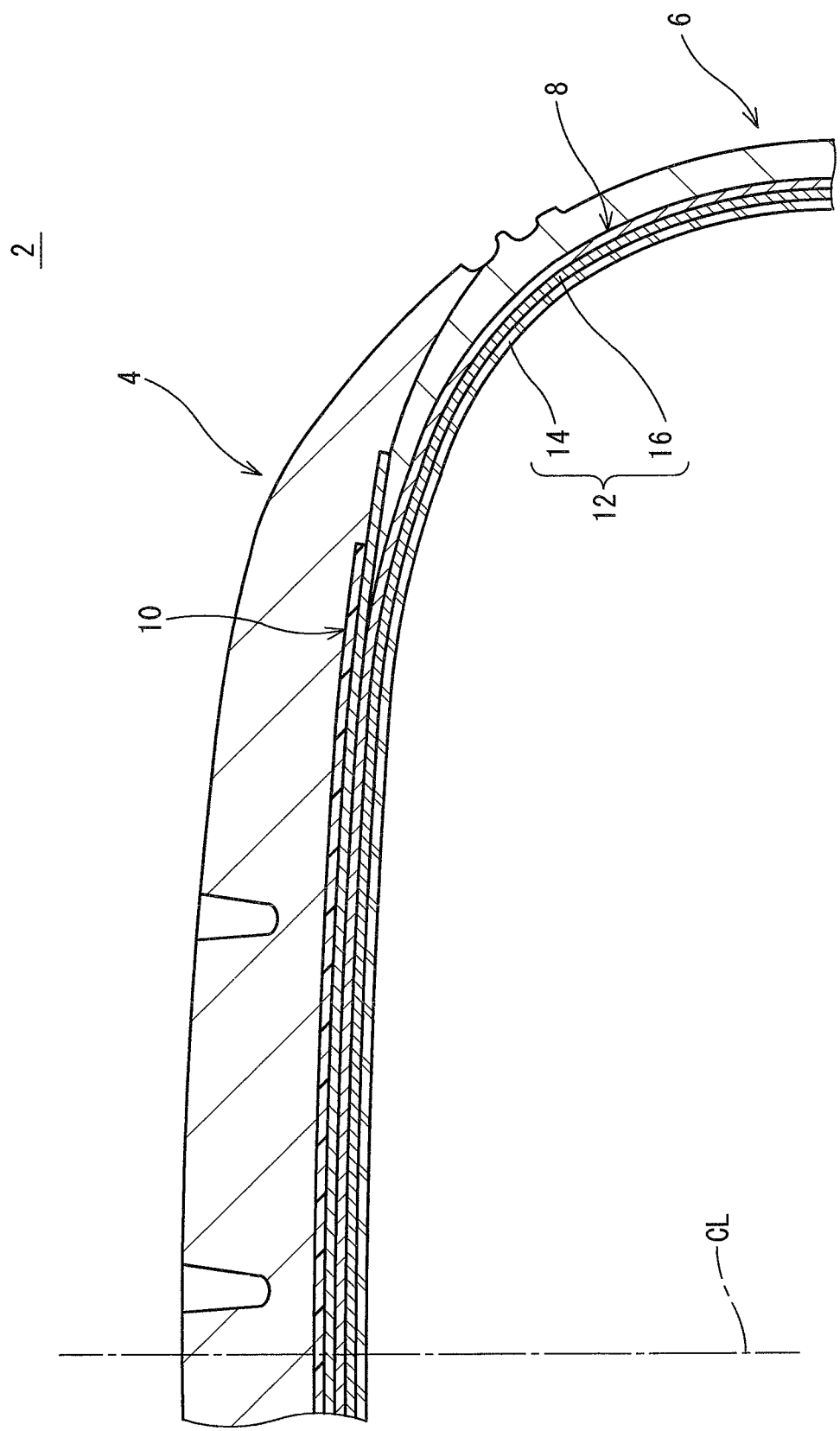
FIG. 6 is an enlarged cross-sectional view showing a portion of a conventional pneumatic tire.
Figure 7:
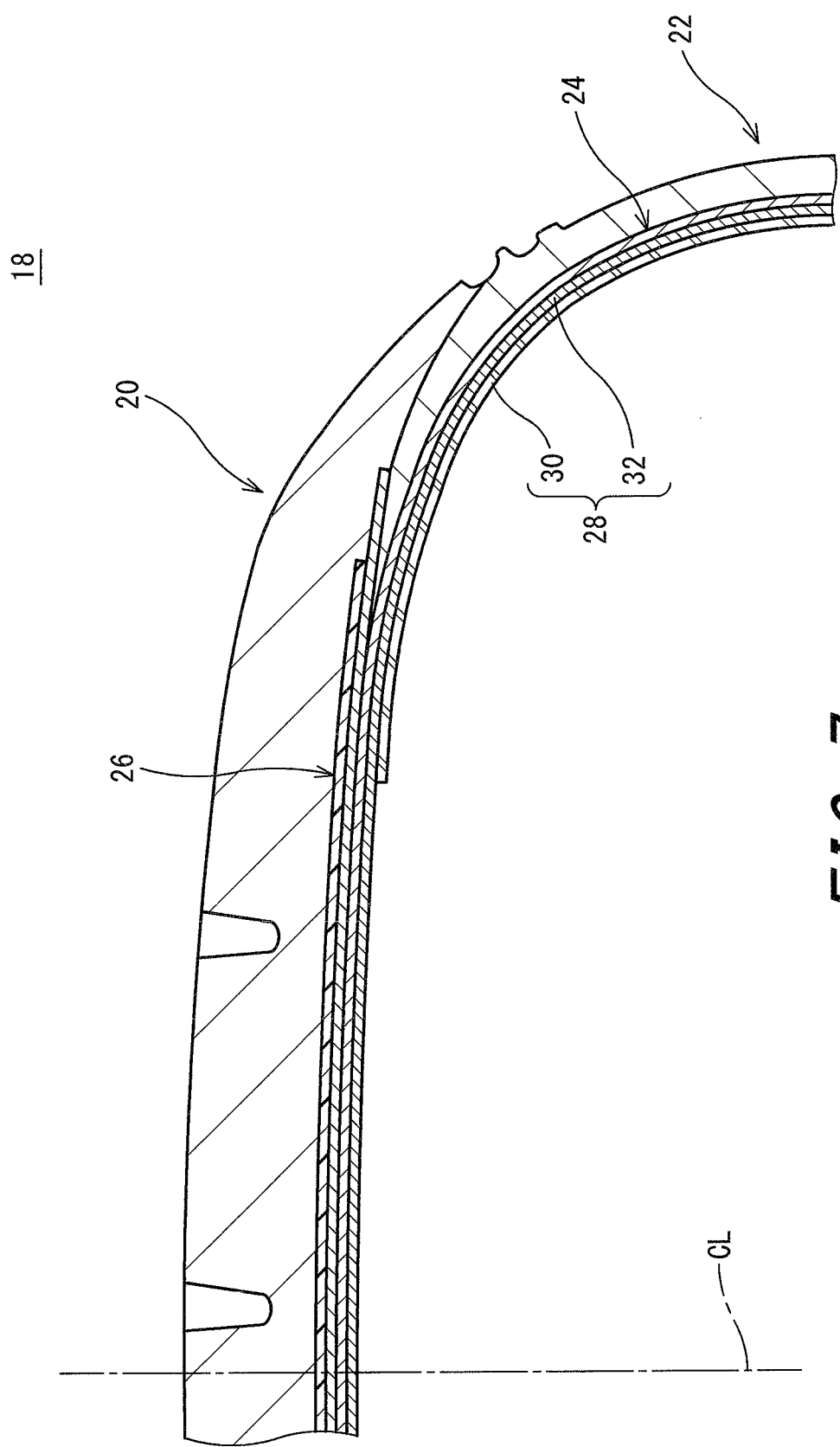
FIG. 7 is an enlarged cross-sectional view showing a portion of a conventional pneumatic tire different from that in FIG. 6.

Comparative Example 1 is a conventional tire. The tire has the structure shown in FIG. 6. In the tire, the ratio (indicated as ratio (WS/WB)) of the distance in the axial direction from the equator plane to the outer end of each sidewall relative to half of the width, in the axial direction, of the belt was set as 75%. The rubber composition of the first inner liner was the same as that of Example 1. The rubber composition of the second inner liner was the same as that of Example 1. The thickness (indicated as thickness TA) of a sheet used for forming the second inner liner was set as 0.5 mm. Bleeder cords were laminated on the outer peripheral surface of the carcass ply. This is indicated as "B" in the table. As the bleeder cords, cords formed from a PET fiber were used. Each of the bleeder cords was configured with 1400 dtex/2. The carcass ply was pricked. The interval d at which the pricking was conducted was set as 60 mm.

[Evaluation of Fraction Defective]

The appearance of each manufactured tire was observed, and the number of tires in which defective appearance such as bare and the like had occurred was counted. The ratio of the counted value relative to the total number of the manufactured tires is indicated as a fraction defective in Tables 1 to 6 below. A lower rate of occurrence indicates a better result.

[Weight Evaluation of Tire]

The weight of each tire was measured. The results of the measurement are indicated in Tables 1 to 6 below as index values for which the result of Comparative Example 1 is defined as 100. A lower value indicates a better result.

[Air Loss Evaluation]

After air was injected into each tire, the tire was allowed to stand for 100 hours. A pressure difference between the pressure immediately after injection and the pressure after standing was obtained, and air leak-resistant performance was evaluated on the basis of the pressure difference. An index obtained with the pressure difference of the tire of Comparative Example 1 defined as 100 is indicated in Tables 1 to 6 below. A lower value indicates a better result.

TABLE 1

Results of Evaluation

|  | Comp. Ex. 1 | Ex. 2 | Ex. 3 | Ex. 4 | Ex. 1 |
|---|---|---|---|---|---|
| Ratio (WR/WB) [%] | — | 50 | 58 | 63 | 67 |
| Distance WD [mm] | — | 15 | 10 | 7 | 5 |
| Inclination angle α [°] | — | 45 | 45 | 45 | 45 |
| Thickness TA [mm] | 0.5 | 0.5 | 0.5 | 0.5 | 0.5 |
| Bleeder cord | B | A | A | A | A |
| Pitch d [mm] | 60 | 60 | 60 | 60 | 60 |
| Fraction defective [%] | 0 | 2 | 1 | 1 | 0 |
| Tire weight | 100 | 98 | 97 | 96 | 96 |
| Air loss | 100 | 100 | 100 | 100 | 100 |

TABLE 2

Results of Evaluation

|  | Ex. 5 | Ex. 6 | Ex. 7 | Ex. 8 | Comp. Ex. 2 |
|---|---|---|---|---|---|
| Ratio (WR/WB) [%] | 70 | 75 | 90 | 98 | 103 |
| Distance WD [mm] | 3 | 0 | −8.5 | −13 | −16 |
| Inclination angle α [°] | 45 | 45 | 45 | 45 | 45 |
| Thickness TA [mm] | 0.5 | 0.5 | 0.5 | 0.5 | 0.5 |
| Bleeder cord | A | A | A | A | A |
| Pitch d [mm] | 60 | 60 | 60 | 60 | 60 |
| Fraction defective [%] | 2 | 2 | 3 | 3 | 3 |
| Tire weight | 96 | 96 | 94 | 95 | 95 |
| Air loss | 100 | 100 | 101 | 101 | 103 |

TABLE 3

Results of Evaluation

|  | Ex. 9 | Comp. Ex. 3 | Ex. 10 | Ex. 11 | Ex. 12 | Ex. 13 |
|---|---|---|---|---|---|---|
| Ratio (WR/WB) [%] | 67 | 67 | 67 | 67 | 67 | 67 |
| Distance WD [mm] | 5 | 5 | 5 | 5 | 5 | 5 |
| Inclination angle α [°] | 25 | 60 | 45 | 45 | 45 | 45 |
| Thickness TA [mm] | 0.5 | 0.5 | 0.3 | 1.0 | 0.5 | 0.5 |
| Bleeder cord | A | A | A | A | B | — |
| Pitch d [mm] | 60 | 60 | 60 | 60 | 60 | 60 |
| Fraction defective [%] | 1 | 1 | 0 | 2 | 2 | 2 |
| Tire weight | 96 | 96 | 98 | 100 | 96 | 96 |
| Air loss | 100 | 100 | 100 | 100 | 100 | 100 |

TABLE 4

Results of Evaluation

|  | Ex. 14 | Ex. 15 | Ex. 16 | Ex. 17 | Ex. 18 | Ex. 19 |
|---|---|---|---|---|---|---|
| Ratio (WR/WB) [%] | 67 | 67 | 67 | 67 | 67 | 67 |
| Distance WD [mm] | 5 | 5 | 5 | 5 | 5 | 5 |
| Inclination angle α [°] | 45 | 45 | 45 | 45 | 45 | 45 |
| Thickness TA [mm] | 0.5 | 0.5 | 0.5 | 0.5 | 0.5 | 0.5 |
| Bleeder cord | A | A | A | A | A | A |
| Pitch d [mm] | — | 20 | 40 | 80 | 100 | 120 |
| Fraction defective [%] | 2 | 0 | 0 | 0 | 0 | 1 |
| Tire weight | 96 | 96 | 96 | 96 | 96 | 96 |
| Air loss | 100 | 100 | 100 | 100 | 100 | 100 |

TABLE 5

Results of Evaluation

|  | Ex. 20 | Ex. 21 | Ex. 22 | Ex. 23 | Comp. Ex. 4 | Comp. Ex. 5 |
|---|---|---|---|---|---|---|
| Ratio (WR/WB) [%] | 67 | 67 | 67 | 67 | 67 | 67 |
| Distance WD [mm] | 5 | 5 | 5 | 5 | 5 | 5 |
| Inclination angle α [°] | 10 | 25 | 30 | 45 | 60 | 90 |
| Thickness TA [mm] | 0.5 | 0.5 | 0.5 | 0.5 | 0.5 | 0.5 |
| Bleeder cord | — | — | — | — | — | — |
| Pitch d [mm] | — | — | — | — | — | — |
| Fraction defective [%] | 2 | 2 | 2 | 2 | 2 | 5 |
| Tire weight | 96 | 96 | 96 | 96 | 96 | 96 |
| Air loss | 100 | 100 | 100 | 100 | 100 | 100 |

TABLE 6

Results of Evaluation

|  | Ex. 24 | Ex. 25 | Ex. 26 | Ex. 27 |
|---|---|---|---|---|
| Ratio (WR/WB) [%] | 67 | 67 | 67 | 67 |
| Distance WD [mm] | 5 | 5 | 5 | 5 |
| Inclination angle α [°] | 45 | 45 | 45 | 45 |
| Thickness TA [mm] | 0.3 | 1.0 | 1.5 | 2.0 |
| Bleeder cord | — | — | — | — |
| Pitch d [mm] | — | — | — | — |
| Fraction defective [%] | 1 | 2 | 2 | 3 |
| Tire weight | 96 | 96 | 96 | 96 |
| Air loss | 100 | 100 | 100 | 100 |

As shown in Tables 1 to 6, the evaluation is higher in the tires of the examples than in the tires of the comparative examples. From the results of evaluation, advantages of the present invention are clear.

INDUSTRIAL APPLICABILITY

The liner of the tire described above can also be applied to various tires.

DESCRIPTION OF THE REFERENCE CHARACTERS 2, 18, 34 . . . tire
4, 20, 36 . . . tread
6, 22, 38 . . . sidewall
8, 24, 42 . . . carcass
10, 26, 44 . . . belt
12, 28, 46 . . . liner
14, 30, 66 . . . first inner liner
16, 32, 68 . . . second inner liner
40 . . . bead
74 . . . first sheet
80 . . . second sheet
84 . . . inclined surface
86 . . . outer surface

The invention claimed is:

1. A pneumatic radial tire comprising:
a tread having an outer surface which forms a tread surface;
a pair of sidewalls extending from ends of the tread, respectively, substantially inward in a radial direction;
a pair of beads located substantially inward of the sidewalls, respectively, in the radial direction;
a carcass extending on and between one of the beads and the other of the beads and along and inward of the tread and the sidewalls;
a belt laminated on the carcass at an inner side, in the radial direction, of the tread; and
a liner located inward of the carcass, wherein
outer ends of the sidewalls are located inward of ends of the belt in an axial direction,
the liner includes a first inner liner extending on and between one of the beads and the other of the beads and along and inward of the carcass; and a pair of second inner liners extending from the ends of the belt, respectively, along the first inner liner substantially inward in the radial direction,
the second inner liners are located between the first inner liner and the carcass,
the second inner liner does not include short fibers,
the second inner liner extends over the inner end in the radial direction of the first inner liner,
outer ends of the second inner liners are located inward of the ends of the belt in the axial direction,
the first inner liner is formed by a first sheet, formed from a first rubber composition, being crosslinked,
each second inner liner is formed by a second sheet, formed from a second rubber composition, being crosslinked,
each second sheet has a reference end corresponding to the outer end of the second inner liner,
in forming the liner, each second sheet is attached to the first sheet such that the reference end of the second sheet abuts against an outer surface of the first sheet,
each second sheet has an inclined surface extending from the reference end so as to be inclined relative to the outer surface of the first sheet,
an inclination angle of the inclined surface of each second sheet is equal to or greater than 10° but equal to or less than 45°,
a base rubber of the first rubber composition includes a butyl rubber,
a base rubber of the second rubber composition includes a diene rubber,
the second rubber composition includes carbon black, an amount of carbon black with respect to 100 parts by weight of the base rubber is equal to or less than 50 parts by weight, and
the second inner liner includes an end surface,
the end surface extends from the outer end of the second inner liner outward in the axial direction so as to be inclined outward in the radial direction,
the end surface of the second inner liner is located inward of the end of the sidewall in the axial direction as a whole,
the outer end of the second inner liner corresponds to the reference end of the second sheet, and
a ratio of a distance WR in the axial direction from an equator plane to the outer end of the second inner liner relative to a distance WB in the axial direction from the equator plane to the end of the belt is equal to or greater than 58% but equal to or less than 67%.

2. The pneumatic radial tire according to claim 1, wherein the outer ends of the second inner liners are located inward of the outer ends of the sidewalls in the axial direction.

3. The pneumatic radial tire according to claim 2, wherein a distance from the outer end of each second inner liner to the outer end of each sidewall is equal to or greater than 5 mm but equal to or less than 30 mm.

4. The pneumatic radial tire according to claim 1, wherein a thickness of each second sheet is equal to or greater than 0.3 mm but equal to or less than 1.5 mm.

5. The pneumatic radial tire according to claim 1, wherein the carcass includes a carcass ply, and
in forming the carcass, the carcass ply is pricked, whereby holes are formed therein.

6. The pneumatic radial tire according to claim 5, wherein an interval at which the carcass ply is pricked is equal to or greater than 20 mm but equal to or less than 100 mm.

7. The pneumatic radial tire according to claim 1, wherein the second inner liner extends substantially inward in the radial direction from a vicinity of the end of the tread toward the bead.

8. The pneumatic radial tire according to claim 1, wherein the sidewall is exposed without being covered by the tread at a part inward in the radial direction from the end of the tread.

* * * * *